Patented Nov. 13, 1945

2,389,011

UNITED STATES PATENT OFFICE 2,389,011

EMULSION COATING COMPOSITIONS

Arthur Ronald Trist, London W. 1, England

No Drawing. Application July 4, 1942, Serial No. 449,817. In Great Britain August 19, 1941

7 Claims. (Cl. 106—243)

This invention relates to improvements in coating compositions for surfaces and includes such compositions as printing inks (both greasy and nongreasy), paints, enamels, distempers, and washes of all kinds which in practice are applied locally (for example by type, printing surface or brush) in a general way (for example by brush, applicator, or spray), or universally (for example by coating machine or spray) on paper, textile material, metal and the surfaces of all kinds of substances, absorbent or nonabsorbent.

The invention contemplates especial application in the paper using industry owing to its adaptation to the requirements of the printing art in all its phases, to the production of wall and ceiling coverings on a paper or other base, and to the manufacture of coated papers.

One object of the present invention is to produce perfect emulsions or emulsified components which are nonreverting, stable, oil phase products that will not split up or separate and are suitable for use as vehicles for pigments and binders.

Another object of the invention is to produce printing inks, paints, enamels, distempers and washes in the form of resinated and/or pigmented compositions that are very economical of the material applied by the vehicle, that do not evolve vapours injurious to the health of the worker, that are uninflammable in bulk and vapour form, that will dry with extraordinary rapidity at normal room temperature and that can be constituted as to provide for a subsequent mechanical treatment producing a polish.

Another object of the invention is to produce a coating composition particularly well suited for application to porous surfaces, said composition being a stable oil phase pigmented emulsion, the viscosity and penetrative capacity of which can be controlled in a reliable manner and which, on evaporation of vehicles and/or solvents forming the liquid phases, leaves a homogenised and perfectly colloidalised coating of pigment and binder.

The invention consists of an improved coating composition for surfaces in which the vehicle for the pigments, dyes and/or binders is an emulsion having a continuous oil phase and a disperse phase of colloidal water particles each of which is enclosed in an elastic protective colloid that is insoluble in either of the phases.

To facilitate description the following definitions are adopted:

The expression petroleum when used herein is intended to include all petroleum fractions or petroleum products that do not evolve an inflammable vapour when homogenised in the continuous phase at low room temperatures, such for example, as kerosene of any origin.

The expression acidic polymer when used herein is intended to include any polymer, which will form an elastic oil and water insoluble colloidal protective covering outside the water particle of an oil phase dispersion by chemically reacting with a metallic salt, such for example, as linseed oil highly polymerised by a heavy boiling (600° F.) to raise the acid content and provide free fatty acid, particularly linoleic acid, in enhanced quantities incidental to the temperature.

The expression condensation product when used herein is intended to refer to artificial products suitably constituted to react with the metallic salt selected such, for example, as the products arising from the reaction of phthalic anhydride on glycerol commonly called alkyd resins and in particular, to refer to alkyd resins modified with fatty acids to produce a final resin, the acid value of which may lie between 3 and 20 both inclusive.

The expression metallic salt when used herein is intended to include the chlorides, sulphates and other salts of such metals as aluminium, calcium, magnesium, zinc, or the like as will react with the acidic polymer or alkyd resin.

The expression catalytic dispersing agent when used herein is intended to refer to any oil soluble dispersing or wetting-out agent which will function both as a dispersant of the liquid phases as well as of the pigment and as an assistant (emulsifying catalyst) to facilitate combination and emulsification between all the substances used, such for example, as a cyclohexylamine fatty acid soap of suitable kind.

The expression pigment when used herein is intended to refer to any pigment used in or any substance regarded as a pigment (coloured or otherwise) in the graphic arts, paint industry or decorative trades of suitable tint and character to the coating composition contemplated and subject only to the limitation that the electrical charge of the pigment particle shall not be inimical to the other ingredients in the compound.

To simplify the explanation of the invention it can be said that the cooperation of a catalytic dispersing agent and an acidic polymer dissolved in the oil phase with a phase controller dissolved in the water phase during colloidal milling, produces the improved product.

For example, if the catalytic dispersing agent is cyclohexylamine fatty acid soap, the acidic polymer is highly polymerised linseed oil and the phase controller is magnesium chloride then during the colloidal milling the water is powerfully dispersed by the cyclohexylamine fatty acid soap and the magnesium chloride reacts with the highly polymerised linseed oil to produce magnesium linoleate which, owing to the change in surface tension at the interfaces incidental to the presence of the magnesium chloride, forms a curved highly elastic insoluble envelope for each of the water particles thus producing a completely stable oil phase emulsion with the water of the disperse phase in a colloidal state sufficiently advanced to exhibit very active Brownian motion.

The quantity of phase controller is comparatively small and an efficient vehicle for other ingredients can be prepared by simultaneously passing equal parts of the following solutions through a colloid mill that will reduce the waterphase to particles of less than one micron.

*Solution A*

| | Pounds by weight |
|---|---|
| Highly polymerised linseed oil | 4 |
| Cyclohexylamine fatty acid soap | 2 |
| Petroleum | 500 |

*Solution B*

| | Pounds by weight |
|---|---|
| Magnesium chloride | 1 |
| Water | 500 |

Clearly either or both of the phases may contain a dye dissolved therein and/or a pigment in suspension and the oil phase may have a resin dissolved in it.

Further, the water phase may contain a starch, a gum, an ester gum, a dextrin and/or a sugar to control the degree of penetration of the oil phase into the absorbent surface and impart or assist in imparting a gloss so that as a final result the improved product dries very rapidly, does not water wet the paper or other absorbent material, applies the coating substance with great economy, and has a very high tinctorial value.

Such a composite emulsion is particularly suited for application to paper as a coating because it will neither water wet nor unduly oil wet the surface to which it is applied, so that newsprint and other low grade wood pulp papers can be coated by machines at speeds comparable with the highest printing speed, because the tensile strength of the paper web is not reduced, i. e. 700 to 1000 feet per minute when the coating emulsion is applied. This emulsion dries with great rapidity when applied and leaves, after dissipation of the petroleum and water, an extremely thin homogenised and perfectly colloidalised layer consisting of pigment, resin and starch.

The control of penetration is of great value when dealing with certain kinds of ink, for example, if a suitably pigmented emulsion is constituted as a gravure ink, such ink will penetrate the surface of certain cheap and porous paper only to the desired extent.

From the above it will be seen that reactive agents are present in both the water and the oil solutions which react and coact during homogenisation to give colloidal protection which is durably elastic and not brittle, and which at the same time is insoluble in both the continuous and disperse phases.

The colloidal milling can be effected in a colloid mill, a hydraulic homogeniser, a rotary turbo homogeniser or any other emulsifying machine capable of producing water particles less than one micron in size, say for example, in the order of one quarter of a micron.

I claim:

1. A process of preparing a stable water in oil emulsion which comprises colloidally milling a petroleum solution of a linseed oil highly polymerized by heavy boiling at a temperature of about 600° F. to raise its acid content with an aqueous solution of a water soluble salt of a metal selected from the group consisting of aluminum, calcium, magnesium and zinc until the product of reaction between the polymerized linseed oil and the metal salt forms a highly elastic water and oil insoluble envelope for each of the colloidal water particles.

2. A process of preparing a stable water in oil emulsion which comprises colloidally milling a petroleum solution containing dissolved therein a linseed oil highly polymerized by heavy boiling at a temperature of about 600° F. to raise its acid content and a cyclohexylamine fatty acid soap with an aqueous solution of a water soluble salt of a metal selected from the group consisting of aluminum, calcium, magnesium and zinc until the product of the reaction between the polymerized linseed oil and the metal salt forms a highly elastic water and oil insoluble envelope for each of the colloidal water particles.

3. A process of preparing a stable water in oil emulsion which comprises colloidally milling a petroleum solution containing dissolved therein a linseed oil highly polymerized by heavy boiling at a temperature of about 600° F., to raise its acid content, of a cyclohexylamine fatty acid soap and an alkyd resin with an aqueous solution of a water soluble salt of a metal selected from the group consisting of aluminum, calcium, magnesium and zinc until the product of the reaction between the polymerized linseed oil and the metal salt forms a highly elastic water and oil insoluble envelope for each of the colloidal water particles.

4. An improved coating composition for surfaces in which the vehicle for other ingredients is a water in oil emulsion having a continuous petroleum phase and a disperse phase of colloidal water particles each of which is enclosed in an elastic, water and oil insoluble film consisting of the reaction product of a linseed oil highly polymerized by heavy boiling at a temperature of about 600° F. to raise its acid content with a water soluble salt of a metal selected from the group consisting of aluminum, calcium, magnesium and zinc.

5. An improved coating composition for surfaces in which the vehicle for other ingredients is a water in oil emulsion containing a cyclohexylamine fatty acid soap and having a continuous petroleum phase and a disperse phase of colloidal water particles each of which is enclosed in an elastic, water and oil insoluble film consisting of the reaction product of a linseed oil highly polymerized by heavy boiling at a temperature of about 600° F. to raise its acid content with a water soluble salt of a metal selected from the group consisting of aluminum, calcium, magnesium and zinc.

6. An improved coating composition for surfaces in which the vehicle for other ingredients is a water in oil emulsion containing a cyclohexylamine fatty acid soap and an alkyd resin and having a continuous petroleum phase and a disperse phase of colloidal water particles each of which is enclosed in an elastic, water and oil insoluble film consisting of the reaction product of a linseed oil highly polymerized by heavy boiling at a temperature of about 600° F. to raise its acid content with a water soluble salt of a metal selected from the group consisting of aluminum, calcium, magnesium and zinc.

7. An improved coating composition for surfaces in which the vehicle for other ingredients is a water in oil emulsion having a continuous petroleum phase and a disperse phase of colloidal water particles each of which is enclosed in an elastic, water and oil insoluble film consisting of the reaction product of magnesium chloride with a linseed oil highly polymerized by heavy boiling at a temperature of about 600° F. to raise its acid content.

ARTHUR RONALD TRIST.